United States Patent [19]
Burgarella

[11] Patent Number: 6,053,469
[45] Date of Patent: Apr. 25, 2000

[54] LOW-COST 2-AXIS MIRROR MOUNT

[75] Inventor: Steven M. Burgarella, Framingham, Mass.

[73] Assignee: General Scanning, Inc., Watertown, Mass.

[21] Appl. No.: 08/948,263

[22] Filed: Oct. 9, 1997

Related U.S. Application Data

[63] Continuation of application No. 08/555,038, Nov. 8, 1995, abandoned.

[51] Int. Cl.[7] ...................................................... A47G 1/24
[52] U.S. Cl. .............................................................. 248/476
[58] Field of Search ..................................... 248/466, 476, 248/481, 288.31, 288.51; 359/871, 872, 873, 875

[56] References Cited

U.S. PATENT DOCUMENTS

| | | |
|---|---|---|
| 1,828,460 | 10/1931 | Emerson . |
| 2,760,405 | 8/1956 | Frischmann . |
| 3,290,985 | 12/1966 | Bains et al. . |
| 3,588,025 | 6/1971 | Gersman ............................. 248/481 X |
| 3,613,464 | 10/1971 | Archer .................................... 359/872 |
| 3,815,429 | 6/1974 | Goulart . |
| 4,037,229 | 7/1977 | Dunk .............................. 248/288.31 X |
| 4,089,233 | 5/1978 | Sebald ................................. 359/873 X |
| 4,101,205 | 7/1978 | Bos . |
| 4,139,948 | 2/1979 | Tsuchiya et al. . |
| 4,209,233 | 6/1980 | Eisler ................................. 248/466 X |
| 4,331,384 | 5/1982 | Eisler . |
| 4,621,899 | 11/1986 | Hoult et al. . |
| 4,690,507 | 9/1987 | Zimmerman . |
| 4,925,286 | 5/1990 | Cutburth ................................. 359/872 |
| 4,941,638 | 7/1990 | DiSalvatore ............................ 248/481 |
| 4,946,329 | 8/1990 | Krueger . |
| 4,976,528 | 12/1990 | Cuda ...................................... 359/875 |
| 5,418,652 | 5/1995 | Gnann ..................................... 359/871 |

*Primary Examiner*—Anita M. King
*Assistant Examiner*—Dave Heisey
*Attorney, Agent, or Firm*—Cesari and McKenna, LLP

[57] ABSTRACT

An system for orienting optical components comprises a spherical mirror support that rests in an indentation and a separate fixture for aligning the support. The alignment fixture engages the support for alignment and then is removed once the desired orientation has been secured by a simple clamp.

20 Claims, 2 Drawing Sheets

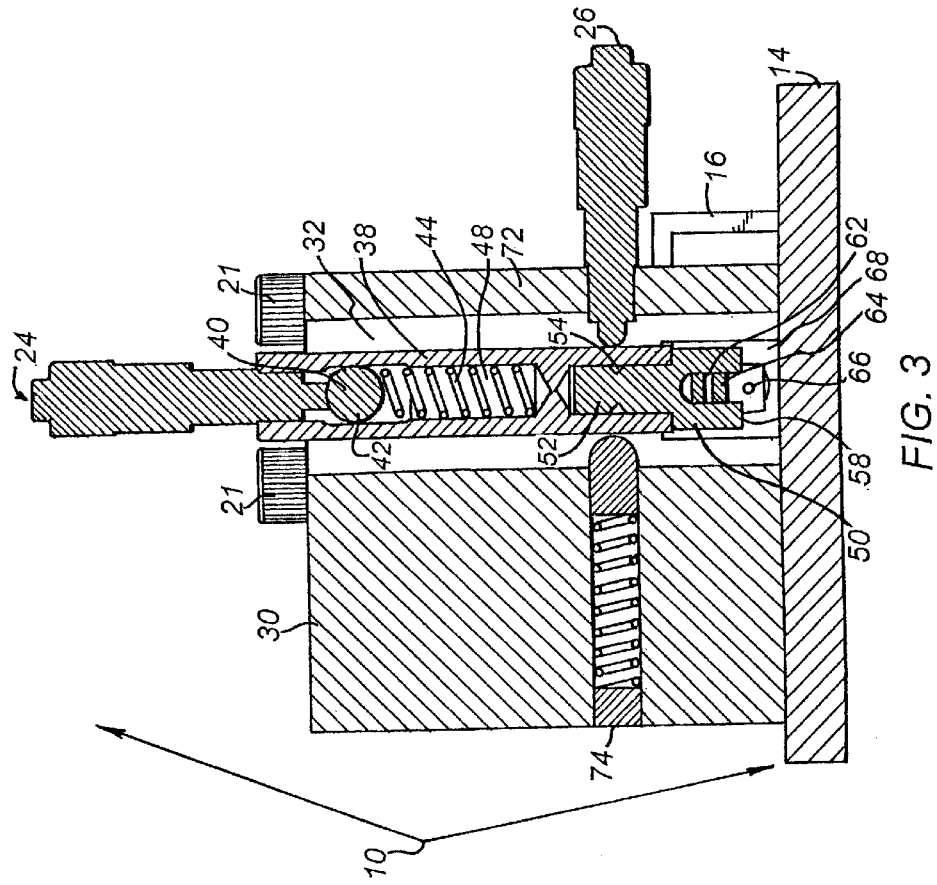
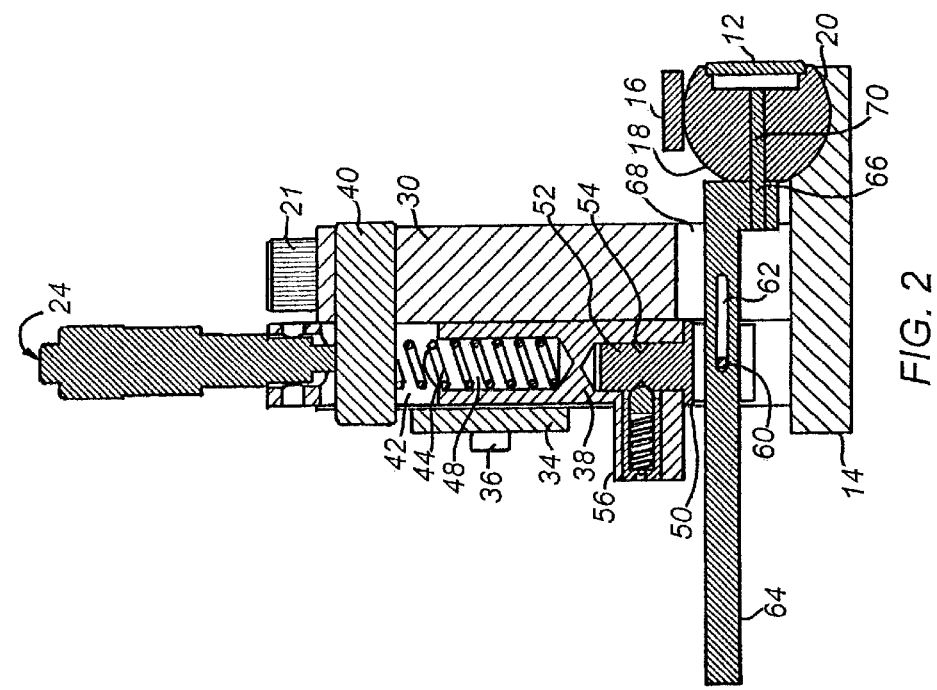

LOW-COST 2-AXIS MIRROR MOUNT

RELATED APPLICATION

This application is a continuation of Ser. No. 08/555,038, filed Nov. 8, 1995, now abandoned.

FIELD OF THE INVENTION

This invention relates to mounts for optical components. Particularly, it relates to alignable supports for mirrors on laser tables.

BACKGROUND OF THE INVENTION

The conduct of optical measurements often requires the precise alignment of optical components such as mirrors and gratings. Typically, a component is secured to a base by an alignment mechanism which aligns the component and clamps it in place. This approach requires that each optical component have a dedicated alignment mechanism, each entailing expensive precision adjustment components such as micrometers. This multiplicity of precision adjustment instruments significantly affects the cost of the system in which the component is incorporated.

DESCRIPTION OF THE INVENTION

Object of the Invention

The principal object of the present invention is, accordingly, to provide an inexpensive method and apparatus for aligning and securing an optical component to a base.

BRIEF SUMMARY OF THE INVENTION

The present invention separates the clamping arrangement from the alignment mechanism. This separation allows the component to be fixed in place by a small, low-cost part while the costly precision adjustment mechanism resides in a removable, reusable fixture.

The clamping arrangement of the invention includes a support with a spherical surface that rests in an indentation in the base. A fixture comprising the alignment mechanism removably fastens onto the base. The fixture engages the support so as to allow alignment of the component by operation of adjustment components in the fixture. A simple clamp secures the support to the base in the desired orientation after alignment, and the fixture is then removed from the base.

BRIEF DESCRIPTION OF THE DRAWINGS

The foregoing discussion will be understood more readily from the following detailed description of the invention, when taken in conjunction with the accompanying drawings, in which:

FIG. 2 is a section along line 2–2' of FIG. 1A.

FIG. 3 is a section along line 3–3' of FIG. 1B.

It will appreciated that, for purposes of illustration, these figures are not necessarily drawn to scale.

DETAILED DESCRIPTION OF THE INVENTION

Figure 1B:
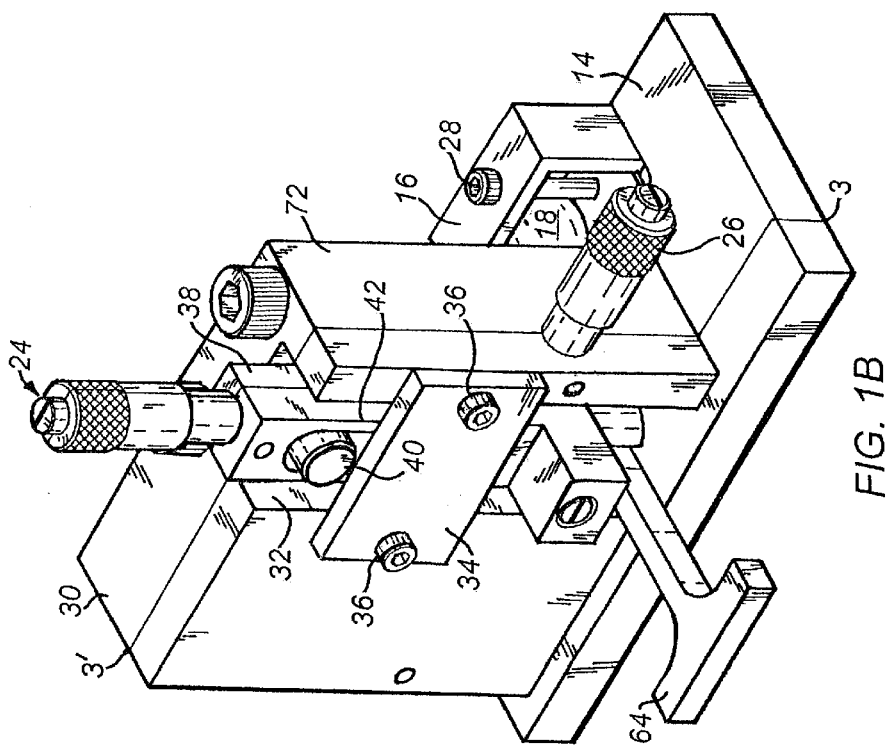
FIGS. 1A–1B are isometric views of alignment and clamping fixtures used to mount a mirror on a base in accordance with the invention.
Figure 1A:
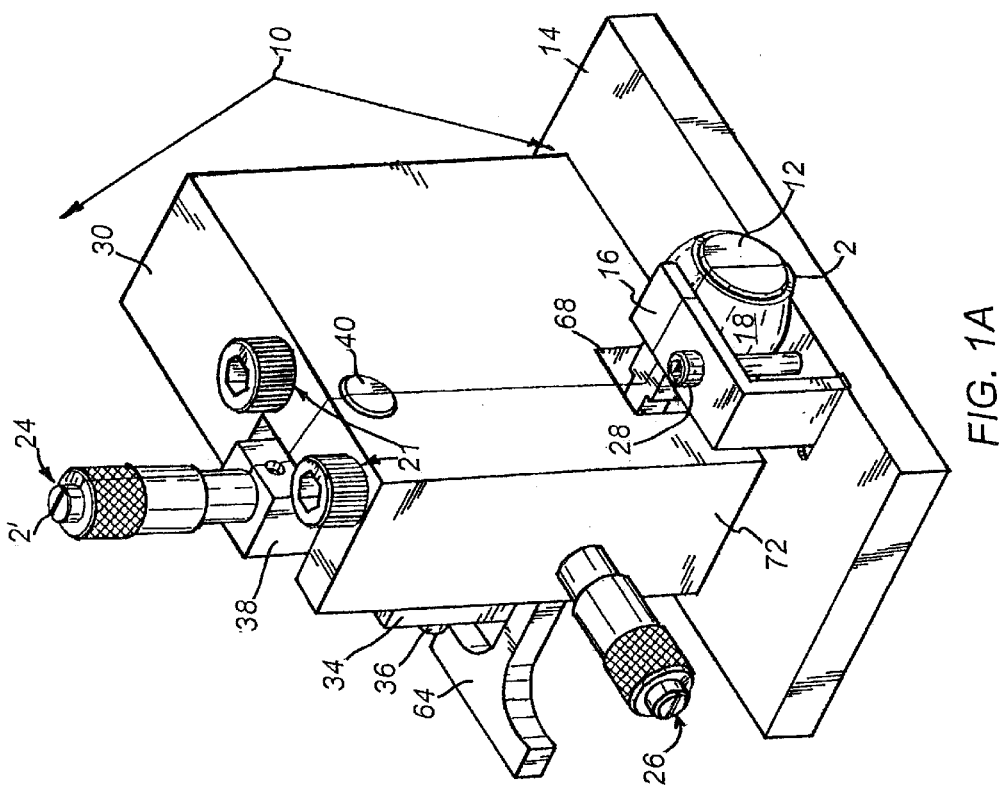

FIG. 1A shows the front face of an alignment fixture 10, which is positioned to align a mirror 12 mounted on a base 14. The mirror is secured to the base 14 by a clamp 16 which applies a clamping force to a mirror support 18 to which the mirror 12 is affixed. The support 18 has a spherical surface that rests in an indentation 20 in the base 14. The fixture 10 is temporarily fastened by bolts 21 onto the base 14. The fixture cooperates with the support 18 so that micrometer adjusters 24 and 26 can be used to adjust the orientation of the support 18 with respect to two mutually perpendicular axes. After thereby achieving the desired alignment of the mirror 12, the support 18 is locked in place by tightening the clamp 16 by means of a bolt 28 which passes through the clamp 16 and into the base 14. The fixture 10 is then removed from the base 14.

As shown in FIG. 1B, the fixture 10 comprises a case 30 having vertical recess 32 in its rear face. A plate 34, secured by bolts 36, retains a column 38 in the recess 32. As described below, a peg 40, affixed to the case 30, extends through a vertical slot 42 in the column 38, thereby permitting vertical translation of the column 38 as well as its rotation about the peg 40.

With reference to FIGS. 2 and 3, the micrometer adjuster 24 is threaded into the upper end of the column 38, and its tip bears against the peg 40. A bias spring 44, located in a bore 48 opening into the slot 42, bears against the peg and thus exerts a downward force on the column 38. Adjustment of the micrometer adjuster 24 thus positions the column 38 vertically with respect to the peg 40 and, therefore, the case 30 and base 14.

More specifically, as shown in FIGS. 2 and 3, a fork 50 includes a shaft 52 that extends upwardly into a bore in the lower end of the column 38. The shaft 52 has a circumferential groove 54 that accommodates the tip of a spring plunger 56. This arrangement fixes the fork 50 vertically with respect to column 38 while permitting rotation around the column's longitudinal axis. The lower end of the fork 50 has two prongs 58 spanned by a pin 60. The pin 60 passes through a slot 62 in an arm 64 to pivotably join the arm 64 to the fork 50. The fork 50 and arm 64 function together to convert linear movement of the column 38 to angular movement of the arm 64. With reference to FIG. 2, the arm 64 extends through an opening 68 in the front face of the case 30, and terminates in a shaft 66 which retractably engages a bore 70 in the support 18. Adjustment of the micrometer adjuster 24 to vertically displace the fork 50 thus changes the orientation of the shaft 66 and causes rotation of the support 18 about a first (horizontal) axis parallel to the plane of the mirror 12 and to the base 14.

FIG. 3 shows the micrometer adjuster 26, extending through a side wall 72 of case 30 so that its tip extends into the recess 32. The tip of a spring plunger 74 biases the column 38 against the tip of the adjuster 26. Adjustment of the micrometer adjuster 26 pivots the column 38 about the peg 40 and thereby displaces the lower end of the fork 50 horizontally. The horizontal displacement of the fork 50 changes the distance between the pin 60 and the mirror support 18. The alignment fixture 10 accommodates this change by adjusting the position of the pin 60 in the slot 62 and/or the extent to which the shaft 66 penetrates the bore 70. The horizontal displacement changes the orientation of the shaft 66 about the longitudinal axis of the column 38 and thus causes rotation of the support 18 about a second (substantially vertical) axis, perpendicular to the first axis. Because of the slight vertical movement of the fork 50 that occurs during this horizontal alignment, it is preferable to first adjust the horizontal orientation and then perform the vertical alignment described above.

After the mirror 12 has been optically aligned as described above, it is secured in position by tightening the bolt 28 down on the clamp 16. Movement of the pin 60 with respect to the slot 62 permits the shaft 66 to be completely retracted from the bore 70 and thus frees the support 18 of the fixture 10. Finally, the bolts 21 are unscrewed and the alignment fixture 10 is removed from the base 14.

The invention is compatible with several geometries of the indentation 20. Rather than a portion of a sphere, the indentation may be cylindrical, for example, or the frustum of a cone or pyramid. For stable clamping, the contact points between the indentation 20 and the mirror support 18 should be arranged symmetrically about the point of contact between the clamp 16 and the support 18. Also, the entirety of the curved surface of support 18 need not belong to one sphere as shown in the figures. For example, a support having a spherical lower surface, resting in the indentation 20, of one radius and a spherical upper surface, in contact with the clamp 16, of a different radius, may be stably clamped if the two spheres defining the surfaces share the same center.

It will therefore be seen that the foregoing represents a highly advantageous approach to the alignment of optical components. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. Apparatus for orienting an optical component, said apparatus comprising:
   a base defining a concavity;
   a support for supporting the component, said support having a spherical portion and being movably positioned in the concavity, and
   a fixture including a case, means for removably mounting the case to the base, and engaging means movably mounted to the case and having a portion releasably engaging the support when the case is mounted to the base, for setting the support to a desired orientation in the concavity, said base including securing means for releasably securing the set support to the base so that the fixture can be removed from the base without affecting the orientation of the support.

2. The apparatus of claim 1 wherein the engaging means comprises an arm, having a longitudinal axis, whereby angular displacement of the arm provides a corresponding angular displacement of the support.

3. The apparatus of claim 2 wherein the fixture comprises a vertical orienting mechanism for vertically pivoting the arm.

4. The apparatus of claim 3 wherein the case has a vertical recess, and wherein the vertical orienting mechanism comprises:
   A. a column, disposed in the recess, having upper and lower ends, and a longitudinal bore opening into a slot;
   B. a peg affixed to the case and extending into the slot;
   C. a bias spring disposed in the bore and urging upward against the peg so as to urge the column downward;
   D. means, secured to the upper end of the column and bearing against the peg, for adjusting the distance between the upper end and the peg; and
   E. means for coupling the arm to the lower end of the column so as to provide vertical pivoting of the arm in response to vertical movement of the column.

5. The apparatus of claim 4 wherein the means for adjusting the distance comprises a micrometer adjuster.

6. The apparatus of claim 2 wherein the fixture comprises a horizontal orienting mechanism for horizontally pivoting the arm.

7. The apparatus of claim 6 wherein the case has a vertical recess, and wherein the horizontal orienting mechanism comprises:
   A. a column, disposed in the recess, having a lower end and an aperture;
   B. a peg affixed to the case and extending into the aperture so as to allow the column to pivot about the peg;
   C. means for adjusting the orientation of the column about the peg; and
   D. means for coupling the arm to the lower end of the column so as to provide horizontal pivoting of the arm in response to horizontal movement of the column.

8. The apparatus of claim 7 wherein the means for adjusting the orientation comprises a micrometer adjuster and a bias spring urging the column against the adjuster.

9. The apparatus of claim 2 wherein the arm has a first slot along its longitudinal axis and the fixture further comprises:
   A. a vertical recess;
   B. a column, disposed in the recess, having upper and lower ends and a longitudinal bore opening into a second slot toward the upper end;
   C. a peg affixed to the case and extending into the second slot;
   D. a bias spring, disposed in the bore so as to urge the column downward;
   E. first adjusting means, secured to the upper end and bearing against the peg, for adjusting the distance between the upper end and the peg so as to move the column vertically;
   F. second adjusting means for adjusting the orientation of the column about the peg so as to move the lower end of the column horizontally;
   G. a fork rotatably secured to the lower end of the column so as to allow horizontal pivoting of the fork; and
   H. a pin spanning the fork and extending through the slot in the arm to provide vertical pivoting of the arm in response to vertical movement of the column and to provide linear horizontal movement of the arm in response to horizontal pivoting of the fork.

10. The apparatus defined in claim 1 wherein the engaging means include
    an arm movably mounted to the case and having an end portion for releasably engaging the support, and
    actuating means in the case for engaging the arm at some distance from said end for swinging the arm in two mutually perpendicular directions.

11. The apparatus defined in claim 1 wherein the engaging means include
    an arm movably mounted to the case and having an end releasably engaging the support, and
    actuating means for engaging the arm at some distance from said end for swinging the arm in two mutually perpendicular directions.

12. A method of orienting an optical component, said method comprising the steps of:
    forming a component support having a spherical portion;
    positioning the spherical portion of the support in a concavity formed in a base;
    removably mounting a case having movable engaging means to the base;

releasably engaging the support with the engaging means to set the support to a desired orientation in the concavity;

releasably securing the set support to the base, and removing the case from the base without affecting the orientation of the support.

13. The method defined in claim 12 wherein the step of releasably engaging the support includes contacting the support with an arm pivotally mounted to the case.

14. The method defined in claim 13 wherein the step of releasably engaging includes adjusting micrometers to pivot the arm to set the support to the desired orientation.

15. The method defined in claim 12 wherein the step of releasably securing includes clamping the set support to the base.

16. Apparatus for orienting an optical component, said apparatus comprising:

a base defining a concavity;

a support for supporting the component, said support having a spherical portion and being pivotally positioned in the concavity;

a fixture including a case, means for removably mounting the case to the support, an arm movably mounted to the case and having an end projecting from the case and releasably engaging the support when the case is mounted to the base, first adjusting means in the case for swinging the arm in a first direction so as to pivot the support to a selected degree about a first axis, second adjusting means in the case for swinging the arm in a second direction so as to pivot the support to a selected degree about a second axis perpendicular to the first axis, said first and second adjusting means thereby setting the support to a desired orientation in the concavity, and securing means in the base for releasably securing the set support to the base so that the case can be removed from the base without affecting the orientation of the support.

17. The apparatus defined in claim 18 wherein the first adjusting means is mounted to the case by a pivot, and the second adjusting means includes a first precision adjuster for tilting the first adjusting means about the pivot in order to swing said arm in said second direction.

18. The apparatus defined in claim 17 wherein said pivot is mounted to the case for movement in said first direction, and said first adjusting means includes a second precision adjuster for moving said pivot in said first direction.

19. The apparatus defined in claim 18 wherein said first and second precision adjusters include first and second micrometers, respectively.

20. The apparatus defined in claim 16 wherein said securing means include a clamp for clamping the support to the base.

* * * * *